(12) United States Patent
Sugata et al.

(10) Patent No.: US 6,639,780 B1
(45) Date of Patent: Oct. 28, 2003

(54) COOLANT FEEDING DEVICE OF MACHINE TOOL

(76) Inventors: Shinsuke Sugata, 12-23, Kusado-cho, 3-chome, Fukuyama-shi, Hiroshima-ken (JP), 720-0831; Takashi Kobayashi, 3753, Minomi-cho, Fukuyama-shi, Hiroshima-ken (JP), 720-0832

( * ) Notice: Subject to any disclaimer, the term of this patent is extended or adjusted under 35 U.S.C. 154(b) by 0 days.

(21) Appl. No.: 09/959,408
(22) PCT Filed: Apr. 24, 2000
(86) PCT No.: PCT/JP00/02701
§ 371 (c)(1),
(2), (4) Date: Oct. 26, 2001
(87) PCT Pub. No.: WO00/66321
PCT Pub. Date: Nov. 9, 2000

(30) Foreign Application Priority Data

Apr. 28, 1999 (JP) .............................................. 11-122290

(51) Int. Cl.⁷ ............................................... H01H 47/00
(52) U.S. Cl. ....................................... 361/140; 361/699
(58) Field of Search ................................ 361/140, 699, 361/717, 718, 719; 409/134, 136

(56) References Cited

U.S. PATENT DOCUMENTS 3,642,202 A * 2/1972 Angelo ........................... 239/8

FOREIGN PATENT DOCUMENTS

| DE | 19632472 | 3/1997 |
|----|----------|--------|
| EP | 1172173 A1 * | 1/2002 |
| JP | 8-118198 | 5/1996 |

* cited by examiner

Primary Examiner—Anthony Dinkins (57) ABSTRACT

The present invention is characterized by a coolant feeding device of a machine tool that supplies coolant to a mist generating device (10) at the tip of a spindle (9) through a coolant feed line (40). A coolant forcing means (11) is provided to the tip of the spindle near the mist generating device to force out the coolant inside a cylinder chamber (21) through a valve path (20). The coolant inside the feed line is repeatedly fed into the cylinder chamber, whereas the coolant forced out from the cylinder chamber is fed into the mist generating device at proper pressure. When the coolant pressure inside the feed line is below a fixed level, the coolant inside the feed line flows into the cylinder chamber. When the coolant pressure inside the feed line is over a fixed level, the coolant inside the cylinder chamber is forced out to the mist generating device.

According to the present invention, liquid dropping and various bad influences are prevented, and a fixed amount of coolant is intermittently fed to the mist generating device. Moreover, a proper amount of coolant is timely fed into the mist generating device by controlling actions of a coolant feed pump.

3 Claims, 5 Drawing Sheets

COOLANT FEEDING DEVICE OF MACHINE TOOL

FIELD OF THE INVENTION

This invention relates to a coolant feeding device of a machine tool.

BACKGROUND OF THE INVENTION

Prior art references (such as the Japanese Patent Publication No. 66437 of 1997) have disclosed machine tools that feed coolant from a coolant feed pump to a mist generating device at the tip of a spindle through a coolant feed line, and that is provided with a valve path at a coolant inflow portion of the mist generating device. Here, the valve means is to close a coolant path when coolant pressure within the feed line lowers below a fixed level.

In the above conventional machine tools, compressed air is mingled with the coolant inside the feed line. When the feed pump stops feeding the coolant, compressed air pressure lowers, and then the air expands, thereby causing a little coolant leakage out of the valve path (this phenomenon is called liquid dropping).

The liquid dropping is a waste of coolant. Besides, when generating mist again, the coolant which remains in the mist generating device may spout outside at a stretch, thereby polluting a work piece and a working environment.

An object of this invention is to provide a coolant feeding device of the machine tool that can solve the above problems.

SUMMARY OF THE INVENTION

The present invention discloses a coolant feeding device of a machine tool that feeds coolant to a mist generating device at the tip of a spindle through a coolant feed line. Besides, a coolant forcing means is provided to the tip of the spindle near the mist generating device to force out the coolant inside a cylinder chamber through a valve path.

Since the coolant forcing means is located near the mist generating device, air remaining in coolant between the coolant forcing means and the mist generating device is very small in quantity, even if many air grains are mixed into the coolant to be fed into the mist generating device. Accordingly, when the coolant forcing means finishes forcint out coolant, the valve path is immediately closed without any influence of the air grains, thereby preventing the coolant inside the feed line from leaking into the mist generating device.

Specifically, the machine tool of this invention supplies coolant from a coolant feed pump to a mist generating device at the tip of a spindle through a coolant feed line. Besides, a coolant forcing means is provided to the tip of the spindle near the mist generating device to force out the coolant inside a cylinder chamber through a valve path. The coolant inside the feed line is repeatedly fed into the cylinder chamber, whereas the coolant forced out from the cylinder chamber is fed into the mist generating device at proper pressure.

According to this structure, a fixed amount of coolant can be fed to the mist generating device properly and intermittently by forcing out coolant from the cylinder chamber.

Moreover, in the present invention, a fixed amount of coolant inside the feed line flows into the cylinder chamber, when the coolant pressure inside the feed line is below a fixed level. On the other hand, the coolant inside the cylinder chamber is forced out to the mist generating device at proper pressure, when the coolant pressure inside the feed line is over a fixed level.

According to this structure, since the coolant forcing means works in connection with a change of the coolant pressure inside the feed line, a proper amount of coolant can be timely fed into the mist generating device by controlling the feed pump.

The present invention is more preferable with the following structure. When the coolant pressure inside the feed line is below a fixed level, a piston forming the cylinder chamber is displaced in a fixed direction by spring force, and a fixed amount of coolant from the feed line flows into the cylinder chamber due to displacement of the piston. On the other hand, when the coolant pressure inside the feed line is over a fixed level, the piston is displaced in a reverse direction to the above fixed direction, and the coolant from the cylinder chamber is forced out to the mist generating device at proper pressure due to reverse displacement of the piston.

According to this structure, the piston is driven only by the spring force and the coolant pressure inside the feed line, thereby effecting simple mechanism of driving the piston.

PREFERRED EMBODIMENT OF THE PRESENT INVENTION

Figure 1:
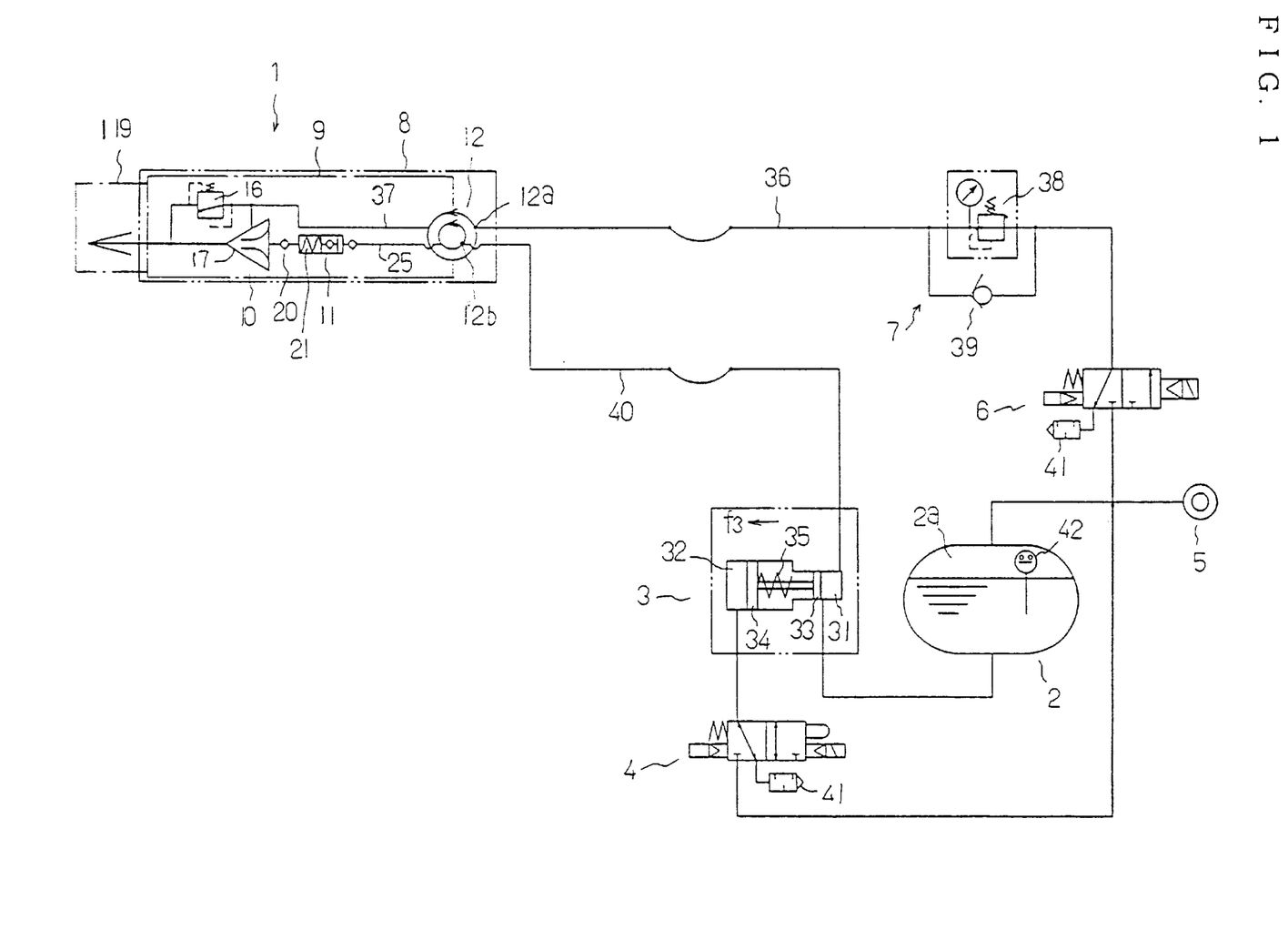
FIG. 1 is a view diagraming a coolant feeding device of a machine tool related to an embodiment of this invention.
Figure 2:
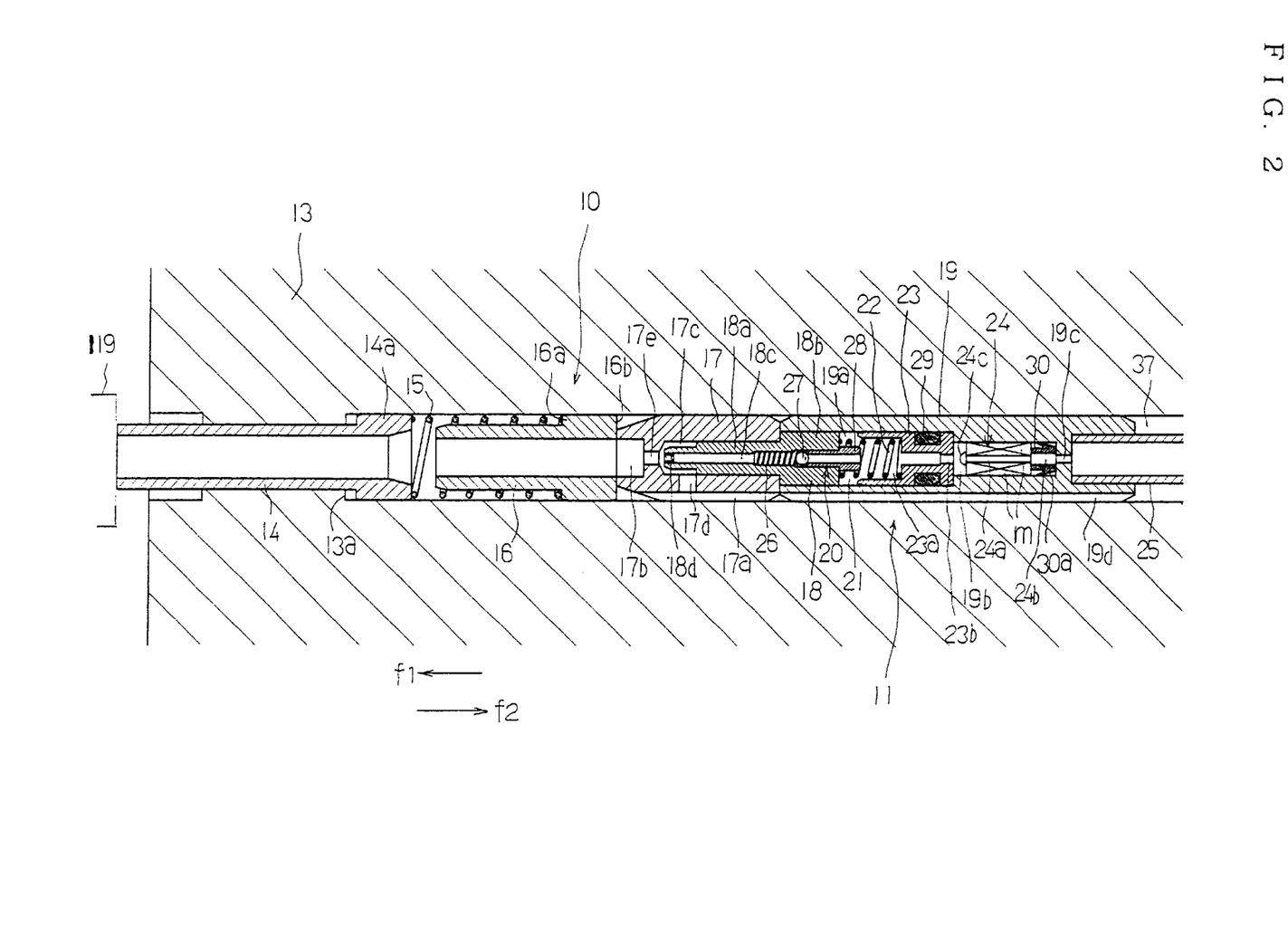
FIG. 2 is a sectional view of a mist generating device and a coolant forcing means provided on the tip of the above machine tool.
Figure 3:
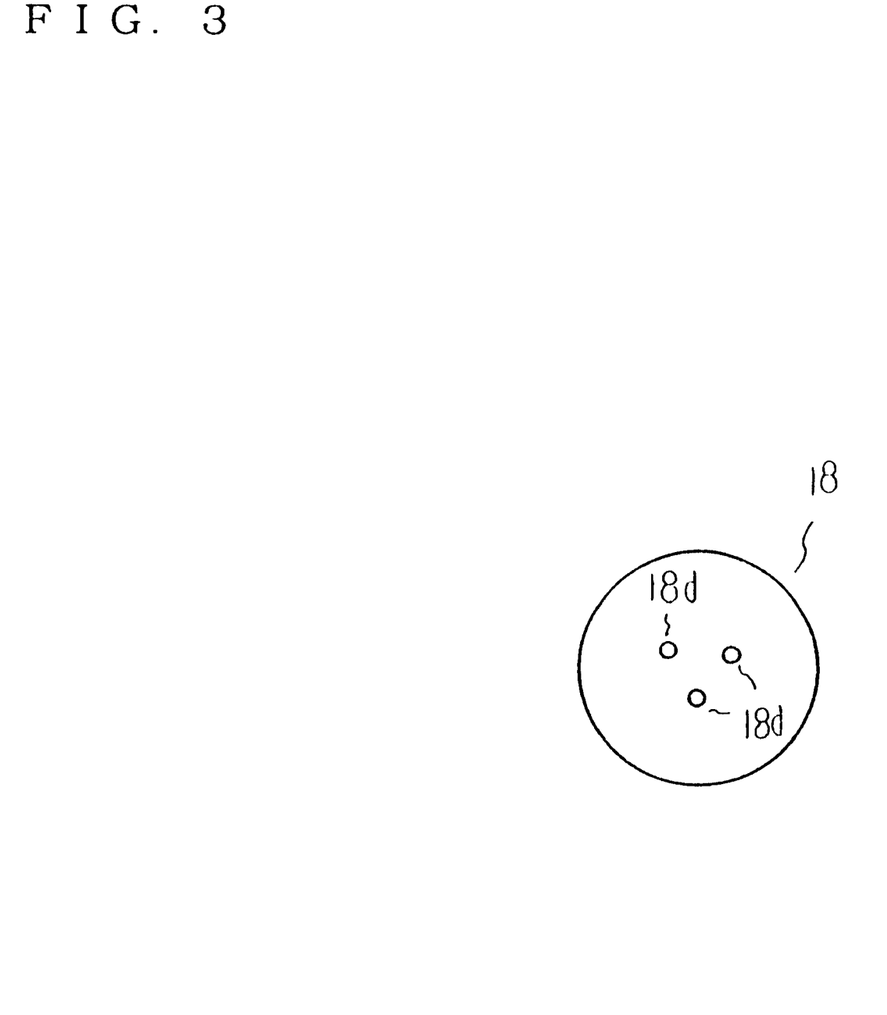
FIG. 3 is a front view of a coolant injection nozzle of the above mist generating device.

An explanation about an embodiment of the present invention will follow with reference to FIG. 1 to FIG. 3.

In these drawings, 1 is a spindle unit, 2 is a coolant tank, 3 is a coolant feed pump, 4 is a directional control valve for driving the pump, 5 is a feed source for compressed air, 6 is a directional control valve for feeding compressed air, and 7 is a pressure adjusting device for air.

Now an explanation follows about each member. The spindle unit 1 comprises a spindle holding cylinder 8 that rotatably holds a spindle 9, and an input part of a not-illustrated rotational power that is provided on the rear of the spindle 9. Besides, the spindle unit 1 comprises a mist generating device 10 and a coolant forcing means 11 that are provided inside the spindle 9, and a rotating joint 12 that is installed to the rear of the spindle holding cylinder 8 in order to feed coolant and compressed air into the spindle 9 from the outside.

As shown in FIG. 2, the mist generating device 10 comprises a mist discharge cylinder 14, a compression spring 15, a cylindrical valve 16, a mist generating cylinder 17, and a coolant injection nozzle 18, all of which are arranged in an inner hole of a cylinder 13 in this order from the front. The cylinder 13 rotates integrally with the spindle 9.

The mist discharge cylinder 14 has a flange 14a on its rear end. Here, the flange 14a is engaged with a stage 13a of the inner hole of the cylinder member 13, thereby preventing the cylinder 14 from getting out toward a forward direction f1. A front face of the cylinder 14 contacts to a rear face of a tool holder 119 that is fixed on the spindle 9.

The cylindrical valve 16 is provided with a stage 16a on its circumferential face, and pressed backward by the compression spring 15 provided between the stage 16a and a rear face of the discharge cylinder 14. Here, the valve 16 is closed when a rear face 16b contacts to a front face of the mist generating cylinder 17, and open when a rear face 16b is away therefrom due to elasticity from the back.

The mist generating cylinder 17 is cylindrical, provided with an air path groove 20a on its circumferential face, a mist exit hole 17b at the inner front, and a rear inner hole 17c at the back. The exit hole 17b has a comparative large diameter, and a front part 18a of the nozzle 18 is inserted into the rear inner hole 17c. The inner hole 17c communicates with the groove 17a through a side hole 17d, and with the exit hole 17b through a path 17e having a comparative small diameter. The nozzle 18 and the coolant forcing means 11 prevent the mist generating cylinder 17 from being displaced in a backward direction f2.

The nozzle 18 is provided with a flange 18b on a rear circumferential face of the front part 18a. The flange 18b is held by the coolant forcing means 11. Besides, at the center of the nozzle 18 is provided a stepped path 18c whose rear is open. As shown in FIG. 3, three injection holes 18d are provided at a front wall of the path 18c.

The coolant forcing means 11 comprises a cylinder member 19, a valve path 20, a cylinder chamber 21, a compressed spring 22, a piston 23, and a sliding valve 24.

The front end of the cylinder member 19 tightly fits to the flange 18b of the nozzle 18, while the rear end fits to the tip of a straight coolant feed pipe 25. Besides, at the center of the cylinder 19 is provided a comparative large inner hole 19a, a comparative small inner hole 19b, and a coolant path 19c that connects the inner hole 19b with the feed pipe 25. Moreover, on a circumferential face of the cylinder 19 is provided an air path groove 19d that communicates with the groove 17a.

The valve path 20 has the following structure. A compression spring 26 and a globe 27 are inserted into the stepped path 18c, and a cylindrical sheet 28 fits on the valve path 20 tightly. The globe 27 is pressed to the tip of the sheet 28 by elasticity of the compression spring 26.

The piston 23 is provided with a sealed ring 29 on its circumferential face, and a spring insertion hole 23a and a coolant path 23b of a comparative small diameter at the center. The piston 23 is inserted into the comparative large inner hole 19a so as to slide back and forth therein.

In this case, the compression spring 22 is provided between the rear of the nozzle 18 and the rear end of the insertion hole 23a, thereby forming the cylinder chamber 21 there.

The sliding valve 24 comprises a guided shaft 24a and a rubber seal 30, being slidably inserted into the inner hole 19b having a comparative small diameter. The seal 30 externally fits to a projection 24b of a small diameter provided at the rear end of the shaft 24a. The guided shaft 24a is provided with a liquid path "m" that is formed by axially cutting several portions of its round shaft. Besides, at the center of the front end of the guided shaft 24a is provided with a hemispherical protruding valve 24c that corresponds to a coolant path 23b of the piston 23. Moreover, the seal 30 is provided with a circular flexible bulge 30a having a conic face in a specific direction.

The coolant feed pump 3 comprises a cylinder chamber 31 for coolant, and a cylinder chamber 32 for compressed air, both of which are provided oppositely. Besides, pistons 33, 34 are provided to correspond to the cylinder chambers 31, 32, respectively. These pistons 33, 34 are integrally connected with each other, and a compression spring 35 is provided to press these pistons 33, 34 in a specific direction for the cylinder chambers 31, 32. Moreover, a not-illustrated check valve is provided to a suction hole and a discharge hole for coolant in the cylinder chamber 31.

A feed line 36 for compressed air has the following structure. The feed line 36 is connected to an upper airtight space 2a in the coolant tank 2, and to a compressed air inlet 12a of the rotating joint 12 through the directional control valve 6 as well as the pressure adjusting device 7. Then from the inlet 12a, the feed line 36 reaches the air groove 17a of the mist generating device 10 through a compressed air path 37 inside the spindle 9. Besides, the feed line 36 diverges at the upper stream of the directional control valve 6, and its branch connects to the cylinder chamber 32 for compressed air in the coolant feed pump 3 through the directional control valve 4 for driving the pump.

The pressure adjusting device 7 has a pressure control valve 38 to adjust feed pressure for compressed air, and a check valve 39 to permit the compressed air inside the compressed air path 37 to flow out toward the directional control valve 6.

A coolant feed line 40 connects the bottom of the tank 2 with the suction hole of the cylinder 31, and the discharge hole thereof with a coolant inlet 12b of the rotating joint 12.

Here, 41 is a silencer to reduce a noise due to compressed air flowing out of the directional control valves 4, 6 into the air, and 42 is a dipstick for the coolant.

A working example and actions of the machine tool will be explained as follows.

The spindle 9 is rotated by a not-illustrated rotational input unit. During its rotations, when the directional control valve 6 is switched to a side of feeding compressed air, compressed air reaches the groove 17a through the rotating joint 12 and the compressed air path 37 of the spindle 9. Then, compressed air flows into the inner hole 17c from the side hole 17d, and spouts toward the exit hole 17b through a comparative small path 17e at high speed.

When the directional control valve 6 is switched over, the directional control valve 4 repeatedly reciprocates between a side of feeding compressed air into the cylinder chamber 32 and a side of discharging compressed air out of the cylinder chamber 32 at proper intervals. In this case, the coolant feed pump 3 works as follows. When the directional control valve 4 is turned to the side of feeding compressed air into the cylinder chamber 32, compressed air is fed into the cylinder chamber 34. Therefore, the piston 34 is pressed towards the piston 33 against elasticity of the spring 35. On the other hand, when the directional control valve 6 is turned to the side of discharging compressed air out of the cylinder chamber 32, compressed air flows out to the air. Therefore, the piston 34 is displaced in a direction B by elasticity of the spring 35. Since such reciprocating displacement of the piston 34 also reciprocates the piston of the cylinder chamber 31, the cylinder chamber 31 sucks and discharges the coolant inside the tank 2 repeatedly.

Thus discharged coolant reaches the coolant forcing means 11 through the rotating joint 12 and the feed pipe 25. Thereafter, the coolant intermittently flows into the coolant forcing means 11 in connection with the reciprocating displacement of the piston 33, while the coolant feed pump 3 is working.

Figure 4:
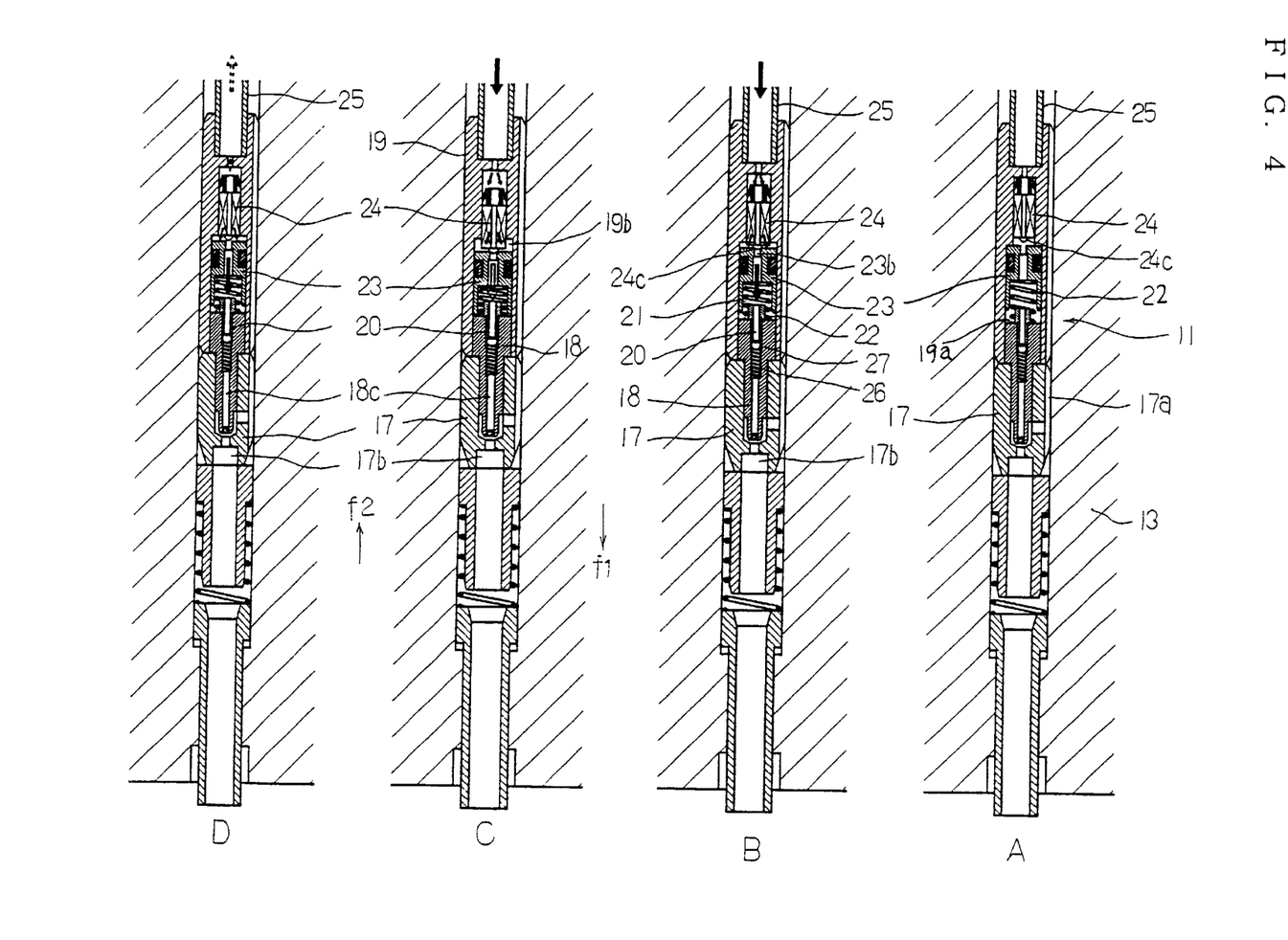
FIG. 4 is an explanatory view showing actions of the above coolant forcing means.

The coolant forcing means 11 works as follows in connection with the coolant feed pump 3. When the piston 33 is not at work or is displaced in an elongative direction of the compression spring 35, coolant feed into the feed pipe 25 stops. Accordingly, the coolant pressure within the feed pipe 25 lowers. At this time, the piston 23 is pressed to the rear end of the inner hole 19a by elasticity of the spring 22, as shown in FIG. 4A.

Then, when the piston 34 is displaced toward the piston 33 against elasticity of the spring 35, the coolant inside the cylinder chamber 31 is fed into the straight feed pipe 25. Accordingly, the coolant pressure within the straight feed pipe 25 rises. At this time, the coolant inside the straight feed pipe 25 flows into the inner hole 19b through the path 19c. Thus flowing coolant displaces the sliding valve 24 in the forward direction f1, and the protruding valve 24c closes the coolant path 23b of the piston 23, as shown in FIG. 4B.

As the piston 34 is displaced toward the piston 33, the coolant inside the feed pipe 25 continuously flows into the inner hole 19b through the coolant path 19c. Thus flowing coolant displaces the sliding valve 24 and the piston 23 in the forward direction f1 against elasticity of the spring 22, as shown in FIG. 4C. In this case, since the sliding valve 24 is always pressed to a rear end face of the piston 23 in connection with pressure which acts on its front and rear end faces, the protruding valve 24c keeps the coolant path 23b of the piston 23 closed. This displacement of the sliding valve 24 and the piston 23 in the forward direction f1 reduces the volume of the cylinder chamber 21. In connection with this, the globe 27 on the valve path 20 is displaced against elasticity of the spring 22 by the coolant which has been filled in the cylinder chamber 21 in advance. Therefore, the valve path 20 is opened, and the coolant inside the cylinder chamber 21 is forced out to the front of the inner hole 18c of the injection nozzle 18.

When displacement of the piston 34 toward the piston 33 stops, coolant feed into the feed pipe 25 stops, and coolant pressure lowers. Therefore, the sliding valve into the feed pipe 24 and piston 23 are forced to move in backward direction f2 by elasticity of the spring 22. If they move even a little, the globe 27 on the valve path 20 closes the valve path 20 immediately, supported by elasticity of the spring 26. On the other hand, a cross sectional area of the inner hole 19a is different from that of the inner hole 19b, and the flexible bulge 30a of the seal 30 prevents the coolant, which stays before the flexible bulge 30a in the forward direction f1, from leaking toward the feed pipe 25. Accordingly, the sliding valve 24 is displaced in the backward direction f2 at higher speed than the piston 23, and then separates from the piston 23, as shown in FIG. 4D. In this state, the protruding valve 24c opens the coolant 23b, and the piston 23 is displaced in the backward direction f2 by elasticity of the spring 22. Therefore, the coolant between the sliding valve 24 and the piston 23 flows into cylinder chamber 21 through the coolant path 23b.

After a certain period, the sliding valve 24 and the piston 23 return to positions shown in FIG. 4A to prepare for the next working, and the same working is repeated subsequently. In accordance with actions of the coolant feed pump 3, the coolant forcing means 11 intermittently forces out a fixed amount of coolant from the valve path 20 to the front of the inner hole 18c of the injection nozzle 18.

The coolant, which is forced out from the coolant forcing means 11, is heavily spouted towards the exit hole 17b from the injection holes 18d of the injection nozzle 18. The spouted coolant is heavily mixed with compressed air in front of the injection holes 18d, and made into coolant mist. Then, the mist reaches the rear of the tool holder 119 through the exit hole 17b, an inner hole of the valve 16, and an inner hole of the mist discharge cylinder 14. Through a central hole of the tool holder 119 and a central hole of a not-illustrated cutting edge fixed to the tool holder 119, the mist flows out of a tip opening of the cutting edge to lubricate a cut part of a work piece "w" during machining it.

When the mist pressure within the inner hole of the discharge cylinder 14 lowers below a fixed level, the valve 16 becomes unbalanced in its longitudinal direction. Therefore, since the valve 16 is displaced in the forward direction f1 against elasticity of the spring 15, its rear separates from the front of the mist generating cylinder 17. Through a gap therebetween, the compressed air inside the air groove 17a flows into the inner hole of the discharge cylinder 14 without passing through the side hole 17d.

During the above processes of producing the mist, when the coolant feed by the feed pump 3 stops by holding the directional control valve 4 to the side of discharging compressed air, actions of the feed pump 3 stop, and the coolant pressure within the feed pipe 25 lowers. Therefore, the coolant forcing means 11 closes the valve path 20 at once in accordance with the above-mentioned actions, regardless of its working state. Besides, the coolant forcing means 11 is turned into a state shown in FIG. 4A, and remains in this state. Then, the directional control valve 6 is switched to the side of discharging compressed air to stop feed of compressed air.

Figure 5:
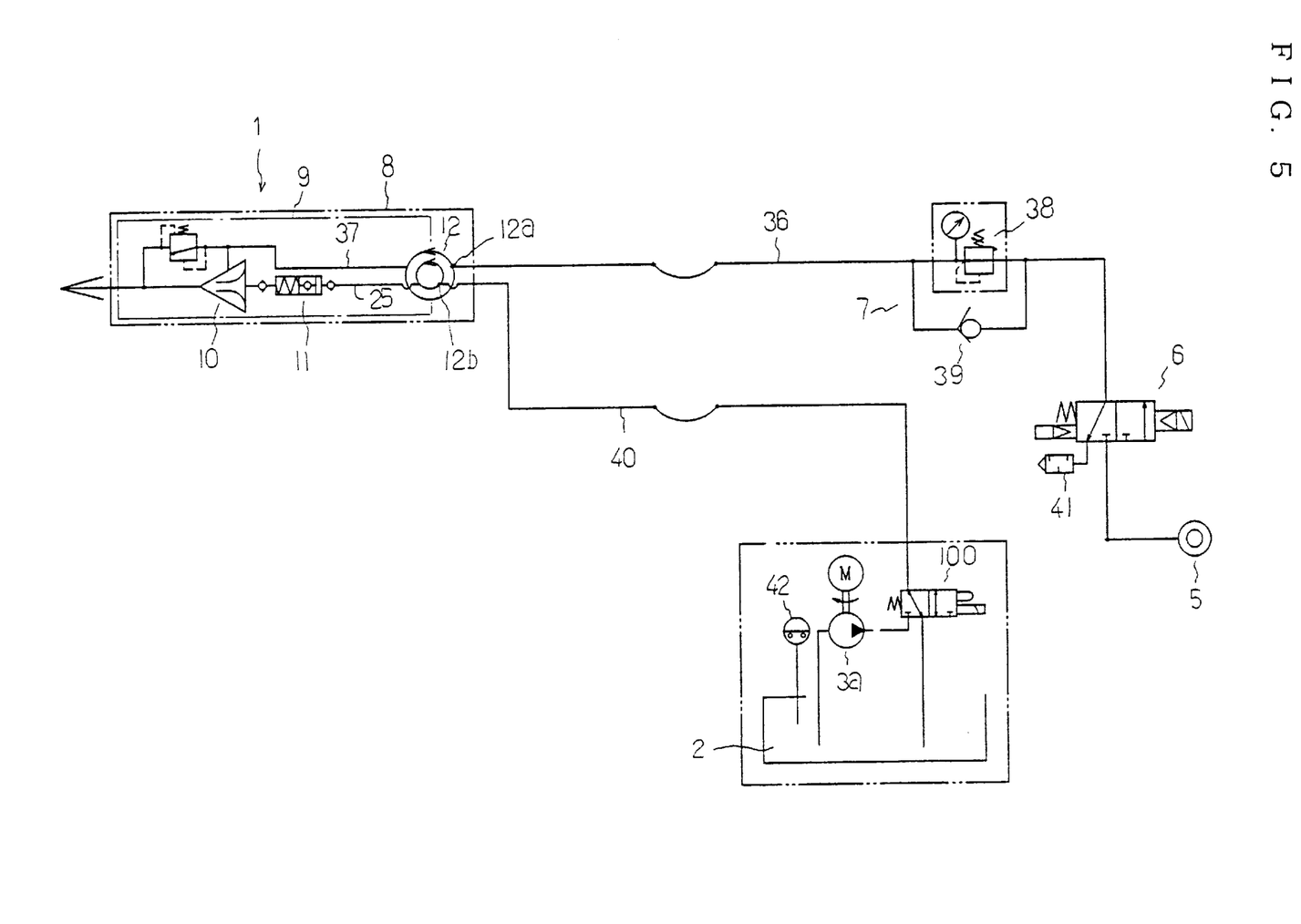
FIG. 5 shows a modification of the above embodiment.

The above-mentioned embodiment can be modified as shown in FIG. 5. In the drawing, the same marks are given to the same parts as in the above embodiment. In this modified example, the feed pump 3a continuously forces out coolant as a gear pump, and a directional control valve 100 for feeding coolant is provided halfway in the feed line 40. The directional valve 100 is turned over alternately between the side of feeding coolant into the feed line 40 and the side of discharging coolant from the feed line 40. During these actions, the coolant inside the tank 2 is intermittently fed into the feed line 40, thereby bringing about the substantially same action of coolant feed as the feed pump 3 in the above embodiment.

UTILITY VALUE IN THE INDUSTRY

According to the above-mentioned invention, the following effects will be given.

Since the coolant forcing means is provided near the mist generating device, the valve path is immediately closed without any influence of air grains mixed in coolant, when the coolant feed line stops feeding coolant. Accordingly, the usual liquid dropping and various bad influences are prevented.

Hence, a fixed amount of coolant is brought into the mist generating device exactly and intermittently.

Besides, a proper amount of coolant can be timely fed into the mist generating device by controlling actions of the coolant feed pump.

Moreover, when the coolant feed pump stops feeding coolant, the piston is displaced by elasticity of the compressed spring. Due to remarkable fall of pressure within the cylinder chamber at this time, the valve path is closed more rapidly. Accordingly, the usual liquid dropping and various bad influences are prevented more effectively.

What is claimed is:

1. A coolant feeding device of a machine tool that supplies coolant from a coolant feed pump (3) to a mist generating device (10) at the tip of a spindle (9) through a coolant feed line (40):

wherein a coolant forcing means (11) is provided to the tip of the spindle (9) near the mist generating device (10) to force out the coolant inside a cylinder chamber (21) through a valve path (20);

wherein the coolant inside the feed line (40) is repeatedly fed into said cylinder chamber (21); and wherein, the coolant forced out from said cylinder chamber (21) is fed into the mist generating device (10) at proper pressure.

2. A coolant feeding device of a machine tool as set forth in claim 1:

wherein a fixed amount of coolant inside the feed line (40) flows into said cylinder chamber (21), when the coolant pressure inside the feed line (40) is below a fixed level; and wherein the coolant inside said cylinder chamber (21) is forced out to the mist generating device (10) at proper pressure, when the coolant pressure inside the feed line (40) is over a fixed level.

3. A coolant feeding device of a machine tool as set forth in claim 2:

wherein a piston (23) forming (he cylinder chamber (21) is displaced ill a fixed direction by spring force, when the coolant pressure inside the feed line (40) is below a fixed level;

wherein a fixed amount of coolant from the feed line (40) flows into the cylinder chamber (21) due to displacement of said piston (23);

wherein the piston (23) is displaced in a reverse direction to said fixed direction, when the coolant pressure inside the feed line (40) is over a fixed level; and wherein the coolant from the cylinder chamber (21) is forced out to the mist generating device (10) at proper pressure due to reverse displacement of the piston (23).

* * * * *

UNITED STATES PATENT AND TRADEMARK OFFICE
CERTIFICATE OF CORRECTION

PATENT NO. : 6,639,780 B1
DATED : October 28, 2003
INVENTOR(S) : Shinsuke Sugata It is certified that error appears in the above-identified patent and that said Letters Patent is hereby corrected as shown below:

Title page,
Insert Item -- [73] Assignee:   Horkos Corp., Fukuyama-shi, Japan --

Signed and Sealed this

Tenth Day of August, 2004

JON W. DUDAS
*Acting Director of the United States Patent and Trademark Office*